United States Patent [19]

Masai

[11] Patent Number: 5,357,090
[45] Date of Patent: Oct. 18, 1994

[54] COPY SERVICE ACCOUNTING DEVICE AND SYSTEM FOR PRINTING A COPY CHARGE IN BAR CODE FORM

[75] Inventor: Katsunori Masai, Amagasaki, Japan

[73] Assignee: Mita Industrial Co., Ltd.

[21] Appl. No.: 900,822

[22] Filed: Jun. 17, 1992

[30] Foreign Application Priority Data

Jul. 8, 1991 [JP] Japan .................. 3-167112

[51] Int. Cl.⁵ ............................ G06F 15/20
[52] U.S. Cl. .................. 235/375; 235/462; 355/201
[58] Field of Search ............. 235/382, 375, 381, 434, 235/462; 355/201, 202

[56] References Cited

U.S. PATENT DOCUMENTS

| | | | |
|---|---|---|---|
| 4,204,637 | 5/1980 | Gray | 235/434 |
| 4,419,573 | 12/1983 | von Geldern | 235/375 |
| 4,440,248 | 4/1984 | Teraoka | 235/462 |
| 4,501,485 | 2/1985 | Tsudaka | 355/201 |
| 4,859,839 | 8/1989 | Telelman et al. | 235/375 |
| 4,918,298 | 4/1990 | Tanabe et al. | 235/382 |
| 4,952,785 | 8/1990 | Kikuda | 235/375 |
| 5,038,293 | 8/1991 | Goodman | 235/381 |
| 5,061,947 | 10/1991 | Morrison et al. | 235/375 |
| 5,101,098 | 3/1992 | Naito | 235/382 |
| 5,117,258 | 5/1992 | Iwata | 355/201 |
| 5,132,727 | 7/1992 | Benker | 355/201 |
| 5,162,639 | 11/1992 | Sugiyama | 235/375 |

FOREIGN PATENT DOCUMENTS 63-6575 1/1988 Japan .

Primary Examiner—Davis L. Willis
Assistant Examiner—Karl D. Frech
Attorney, Agent, or Firm—Renner, Otto, Boisselle & Sklar

[57] ABSTRACT

The present invention provides a copy service accounting device for simplifying a copy service process both for store clerks and customers. When a determined card-like sheet is inserted through a slit of the copy service accounting device connected to a copying machine, the copy service accounting device outputs a copy enabling signal to the copying machine. Data on a number of copies for each copy size is sent from the copying machine to the copy service accounting device, which counts up and stores the number. When copying is finished and a completion switch is pushed, the copy service accounting device calculates a total charge on the basis of the stored number and a unit charge on each copy size. The calculated total charge is printed in bar code form on the card-like sheet, which is then ejected through the slit. When the bar code is read by a bar code reader at a cash register, the charge is immediately registered in the cash register. Thus the copy service process becomes significantly simplified.

6 Claims, 3 Drawing Sheets

COPY SERVICE ACCOUNTING DEVICE AND SYSTEM FOR PRINTING A COPY CHARGE IN BAR CODE FORM

BACKGROUND OF THE INVENTION

1. Field of the Invention

The present invention relates to an accounting device and an accounting system for a copy service for administering a number of copies and charging for the service with a copying machine utilized by unspecified individuals.

2. Description of the Prior Art

Nowadays a copy service is provided in various stores such as a convenience store, where a copying machine is installed for unspecified customers. The copy service is only a part of the services they offer apart from selling other goods. Therefore, it needs to be dealt with simply and correctly so as not to disturb other services. A system in which a user, a customer, counts the number of copies (hereinafter referred to as "the copy number") and calculates a total charge is too complicated and tends to cause trouble. Therefore, various accounting devices for a copy service has been developed.

For example, a copy service device shown in FIG. 9 is disclosed in Japanese Laid-Open Patent Publication No. 63-6575. A user is, at every use, given a recording medium 52, which is generally an IC card or a magnetic card. A copying machine 50 becomes ready for use by inserting the recording medium 52 into a card unit 51 provided on the copying machine 50. A copy number per each copy size is stored in the recording medium 52. When copying is finished and an end key 53 is pushed, the recording medium 52 is ejected. The user takes the ejected recording medium 52 to a cashier. Then, the recording medium 52 is inserted into a card unit 55 of an electronic cash register 54, which multiplies the stored copy number by a unit charge, thereby calculating a total charge. In this way, the copy service can be administered in the same manner as the sale of other goods.

However, the above-mentioned copy service device requires a specific means such as the foregoing cash register for reading the stored information in the recording medium.

On the other hand, a bar code reader is now ordinarily used for reading prices of goods in a convenience store and the like. Therefore, if the bar code reader is also used for charges of the copy service, operations of clerks and the device they use can be unified, resulting in reducing the cost and preventing read errors.

SUMMARY OF THE INVENTION

A copy service accounting device according to the present invention for calculating a copy charge on the basis of data on a copy number output from a copying machine comprises a printing means for printing the copy charge in bar code form on a card-like sheet.

Alternatively, the present invention also provides a copy service accounting system comprising a copying machine and a copy service accounting device for calculating a copy charge based on data on a copy number output from the copying machine, in which the copy service accounting device comprises a printing means for printing the copy charge in bar code form on a card-like sheet, a slit through which the card-like sheet is inserted, and a sheet detection means for outputting a sheet detection signal when the card-like sheet is inserted through the slit, and the copying machine comprises a first control means for starting the copying machine in response to a copy enabling signal from the copy service accounting device only when the sheet detection signal is input from the sheet detection means.

Thus, the invention described herein makes possible the advantages of (1) providing a copy service accounting device and system for calculating a copy charge with a simple operation, (2) providing a copy service accounting device and system for administering a copy service simply and accurately, (3) providing a copy service accounting device and system which is extremely effective when a copy service is offered in a store where fewer clerks should administer many goods such as a convenience store, (4) providing a copy service accounting device and system for administering a copy charge in the same manner as the sales of other goods due to the charge printed in bar code form, and (5) providing a copy service accounting device and system with a lower cost and fewer reading errors due to a card-like sheet used as a recording medium for storing a charge.

These and other advantages of the present invention will become apparent to those skilled in the art upon reading and understanding the following detailed description with reference to the accompanying figures.

DESCRIPTION OF THE PREFERRED EMBODIMENTS

Figure 1:
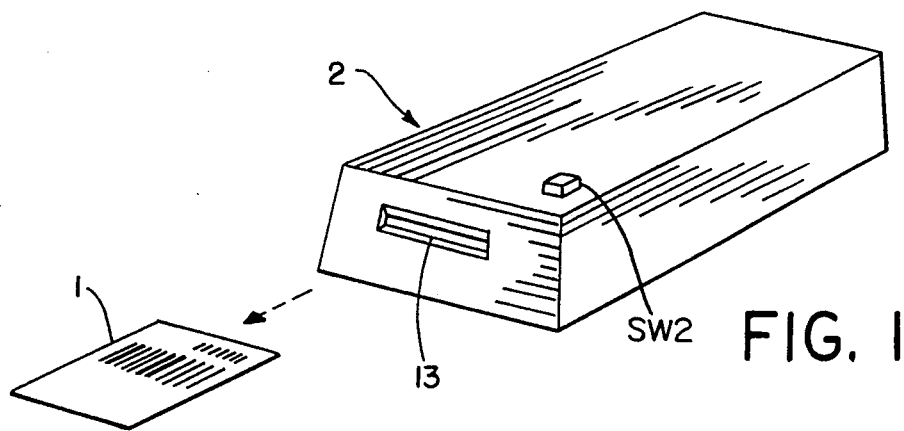
FIG. 1 is a perspective view of a copy service accounting device according to a first example of the present invention.

A copy service accounting device according to the present invention comprises a printing means for printing the copy charge in bar code form on a card-like sheet. When a user inserts the card-like sheet into the copy service accounting device connected to a copying machine, a total charge calculated on the basis of data on a copy number output from the copying machine is printed in bar code form on the card-like sheet, which is then ejected. Then, the copy service charge can be dealt with by reading the bar code.

The copy service accounting device of the present invention may, if necessary, further comprise a slit through which the card-like sheet is inserted and a copy enabling signal output means for outputting a copy enabling signal to the copying machine when insertion of the card-like sheet through the slit is detected. A user inserts the card-like sheet through the slit as an insert portion on the copy service accounting device, which detects insertion of the card-like sheet and outputs a copy enabling signal to the copying machine. The copying machine can not be started unless the copy enabling signal is output, thereby preventing dishonest use of the copying machine. When a copying operation is finished, the card-like sheet bearing a copy service charge in bar code form based on the copy number data output from the copying machine is ejected from the accounting device. The copy service charge can be dealt with by reading the bar code.

The copy service accounting device of the present invention may, if necessary, further comprise a stocker for stocking a plurality of the card-like sheets, an ejection slit through which the card-like sheet is ejected, and a sheet feeding means for feeding the card-like sheet from the stocker to the printing means one by one at the time of starting to copy and ejecting the card-like sheet having been printed on by the printing means through the ejection slit at the time of finishing the copying. A predetermined number of the card-like sheets are stocked in the stocker in the copy service accounting device. When a user starts copying, the card-like sheets are fed to a determined position in the device one by one. The copying machine is controlled so as to be started by an output from the sheet detection means for detecting the existence of the card-like sheet at the determined position. When the copying operation is finished, the copy service charge based on the copy number data output from the copying machine is printed in bar code form on the card-like sheet. The bar code can be read by a bar code reader to deal with the charge.

A copy service accounting system of the present invention comprises a copying machine and a copy service accounting device for calculating a copy charge based on data on a copy number output from the copying machine. The copy service accounting device comprises a printing means for printing the copy charge in bar code form on a card-like sheet, a slit through which the card-like sheet is inserted, and a sheet detection means for outputting a sheet detection signal when the card-like sheet is inserted through the slit. The copying machine comprises a first control means for starting the copying machine in response to a copy enabling signal from the copy service accounting device only when the sheet detection signal is input from the sheet detection means. When a user inserts the card-like sheet through the slit as an insert portion on the copy service accounting device, the sheet detection means of the accounting device detects insertion of the sheet and outputs a signal to the copying machine. The copying machine is controlled so as not to be started unless the card-like sheet is inserted into the accounting device, because the first control means which enables the copying machine to start only when a sheet detection signal is input from the accounting device. Thus, dishonest use is prevented. When a copying operation is finished, a copy service charge calculated on the basis of the copy number data output from the copying machine is printed in bar code form on the card-like sheet. The copy service charge can be dealt with by reading the bar code.

The card-like sheet may be prevented from being used again by punching a card-like sheet which has been once used. A punch hole detection means may be used to control the copying machine for this purpose, thereby preventing dishonest use of the copying machine.

Referring to the attached drawings, the present invention will now be described by way of examples, wherein like reference numerals are used to refer to like elements throughout.

EXAMPLE 1

Figure 3:
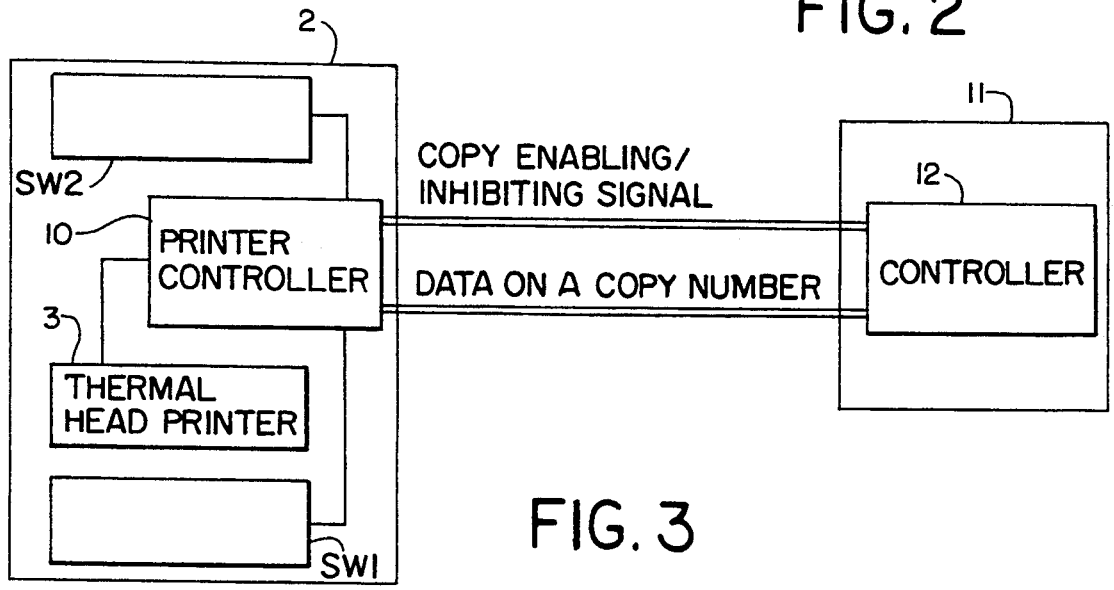
FIG. 3 is a block diagram showing a control system of the device of FIG. 1.

As shown in FIG. 3, a copy service accounting device 2 having the following structure is connected to a controller 12 of a copying machine 11. As shown in FIG. 1, the accounting device 2 has a slit 13 on its front surface and a completion switch SW2. The copying machine 11 is controlled so that a copying operation is started by inserting a card-like sheet 1 through the slit on the accounting device 2. The card-like sheet 1 may be a thermosensitive sheet. When copying is finished and the completion switch SW2 is pushed, a charge calculated on the basis of a copy number is printed in bar code form on the card-like sheet 1, which is then ejected through the slit 13.

Figure 2:
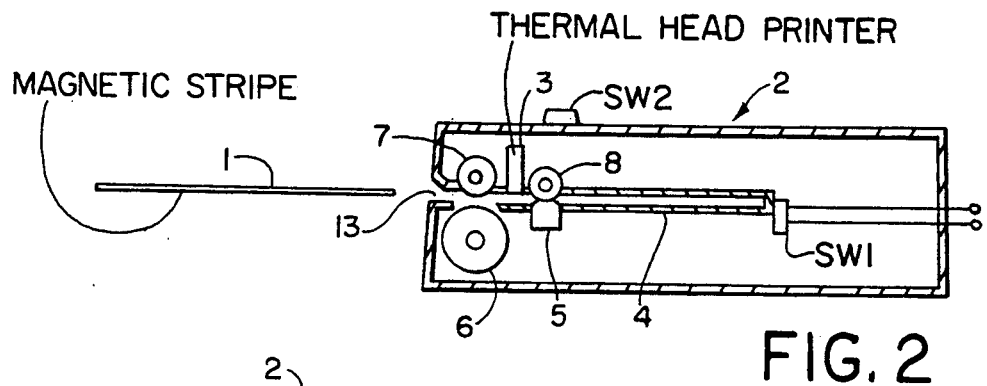
FIG. 2 is a sectional view of the device of FIG. 1.

The operation of the copy service accounting device 2 will now be described referring to FIGS. 2 and 3. When the card-like sheet 1 is inserted through the slit 13 on the copy service accounting device, the card-like sheet 1 is fed to a sheet container 4 by feed rollers 6 and 7, and is detected by a sheet detection switch SW1. A signal output from the sheet detection switch SW1 is input to a printer controller 10. The printer controller 10 outputs a copy enabling signal to the controller 12 of the copying machine 11. Data on a number of copies made by the copying machine 11 is transferred from the controller 12 and stored in the printer controller 10. When the copying operation is finished and the completion switch SW2 is pushed, a charge for the copying operation is calculated on the basis of the copy number stored in the printer controller 10 and a presettled unit price. The calculated charge is printed in bar code form on the card-like sheet 1 by a thermal head printer 3. The card-like sheet 1 is ejected through the slit 13 by the feed rollers 6 and 7 on finishing the copying operation.

In the above described example, the unit price is presettled regardless of copy size. However, a unit price may be settled corresponding to each copy size, and a total charge may be calculated on the basis of the copy number for each copy size. Moreover, characters such as a copy number, a copy size and a serial number together with the bar code may be printed on the card-like sheet 1 by the thermal head printer 3.

Figure 4:
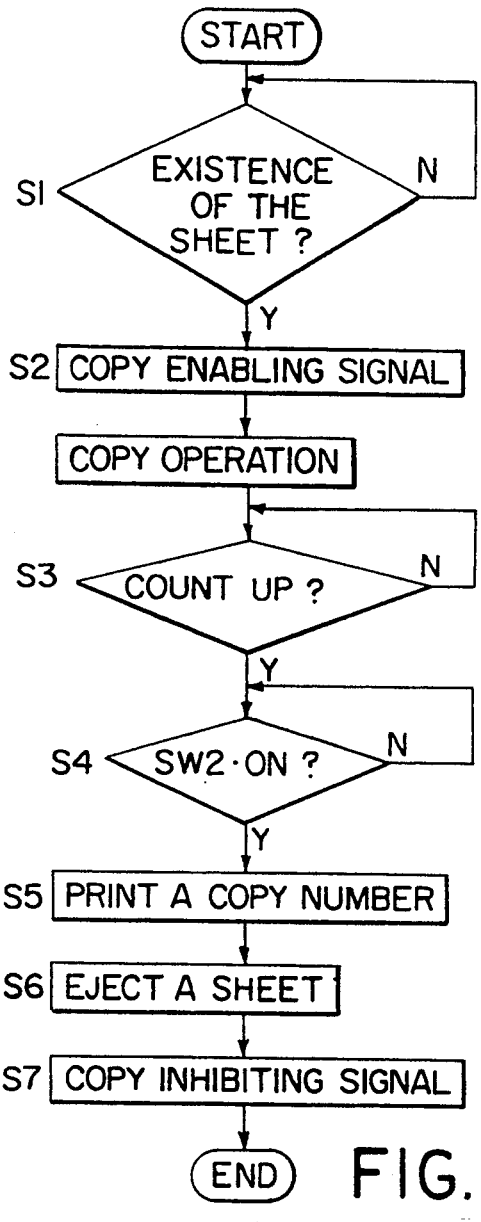
FIG. 4 is a flow chart showing a control system of the device of FIG. 1.

A flow chart of FIG. 4 shows a procedure for the above operation. The existence of the card-like sheet 1 is detected at S1, and if it is detected, an enabling signal is sent to the copying machine 11 at S2. Data on the number of copies made by the copying machine 11 is transferred from the copying machine 11 to the accounting device 2, counted up, and stored (S3). In finishing the copying operation, a push of the completion switch SW2 is detected at S4, and a charge is calculated on the basis of the stored copy number, and is printed in bar code form on the card-like sheet 1 at S5. Then the card-like sheet 1 is ejected (S6). At the same time, the accounting device 2 sends a copy inhibiting signal to the copying machine 11. Thus, the copying machine 11 is controlled to be unoperable without inserting a card-like sheet (S7).

A user who wants to make a copy with the copying machine 11 receives the card-like sheet 1 from a store clerk. After the copying operation, the user returns the card-like sheet 1 bearing the data. Then the bar code is read by a bar code reader, and the charge is immediately registered in a cash register. In this way, the charge for the copy service can be dealt with in the same manner as the sales of other goods. As a result, the copy service process is significantly simplified.

EXAMPLE 2

Figure 6:
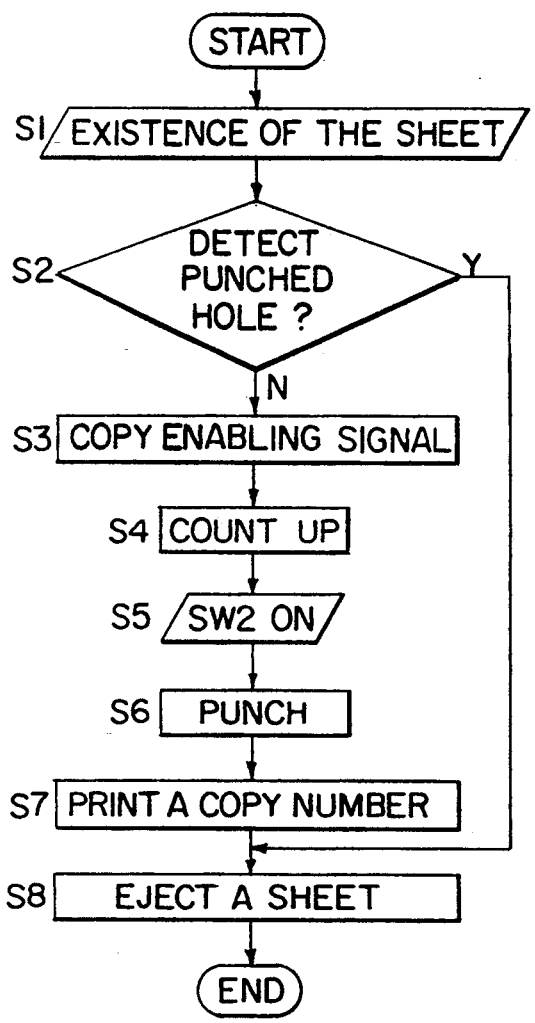
FIG. 6 is a flow chart showing a control system of the device of FIG. 5.

A second example of the present invention will now be described referring to FIGS. 5 and 6.

Figure 5:
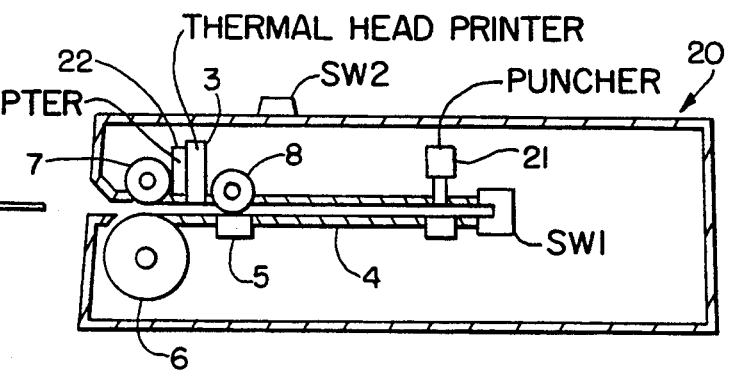
FIG. 5 is a sectional view of a copy service accounting device according to a second example of the present invention.

As shown in FIG. 5, the sheet container 4 in an accounting device 20 is equipped with a puncher 21. The puncher 21 is started when the completion switch SW2 is pushed, and punches the card-like sheet 1 in the sheet container 4 at a determined portion.

Such a punched hole is for avoiding reuse of the card-like sheet 1. The punched hole is detected as described in a flow chart of FIG. 6 as follows: When the card-like sheet 1 is inserted in the sheet container 4 of the accounting device 20 (S1), a photo interrupter (PI) 22 detects a punched hole on the inserted sheet (S2). When a punched hole is detected, the card-like sheet 1 is ejected from the sheet container 4 (S8). When a punched hole is not detected, the card-like sheet 1 is contained in the sheet container 4. The sheet detection switch SW1 is then turned on, and a copy enabling signal is sent to the copying machine 11 (S3), thereby starting the copying machine 11. The number of copies made by the copying machine 11 is sent to the accounting device 20 for counting up and stored therein (S4). When the completion switch SW2 is pushed after the copying operation (S5), the puncher 21 punches the card-like sheet 1 (S6). Then, a charge for the operation is printed in bar code form (S7); and the card-like sheet 1 is ejected from the sheet container 4 (S8).

In this way, dishonest use of the copying machine 11 can be prevented according to this example.

EXAMPLE 3

A third example of the present invention will now be described referring to FIGS. 7 and 8.

Figure 7:
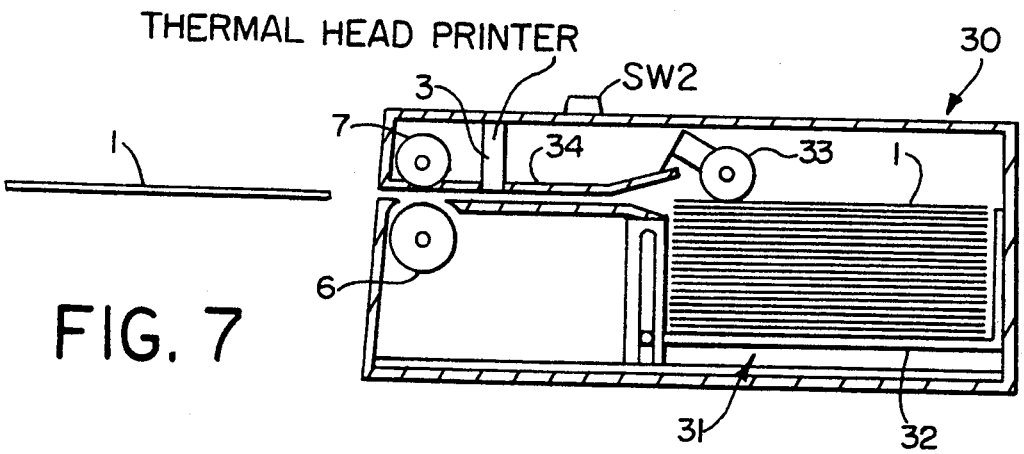
FIG. 7 is a sectional view of a copy service accounting device according to a third example of the present invention.

As shown in FIG. 7, an accounting device 30 is equipped with a stocker 31, in which a determined number of the card-like sheets 1 are stocked. These card-like sheets 1 are successively lifted up by an elevator 32 and are fed to a sheet container 34 by a feed roller 33 one by one.

Figure 8:
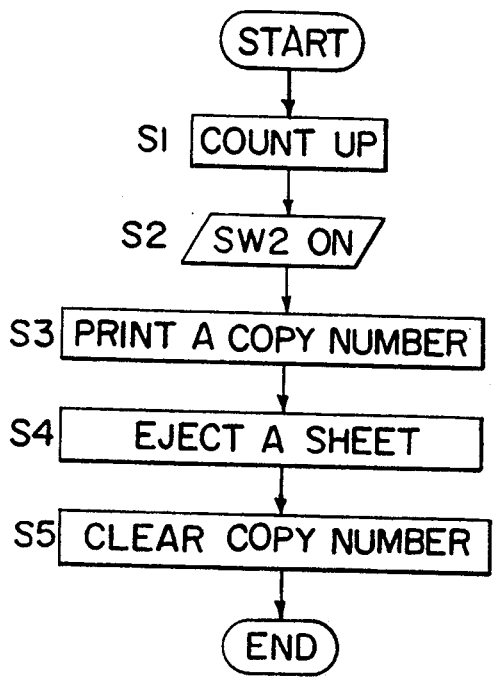
FIG. 8 is a flow chart showing a control system of the device of FIG. 7.
Figure 9:
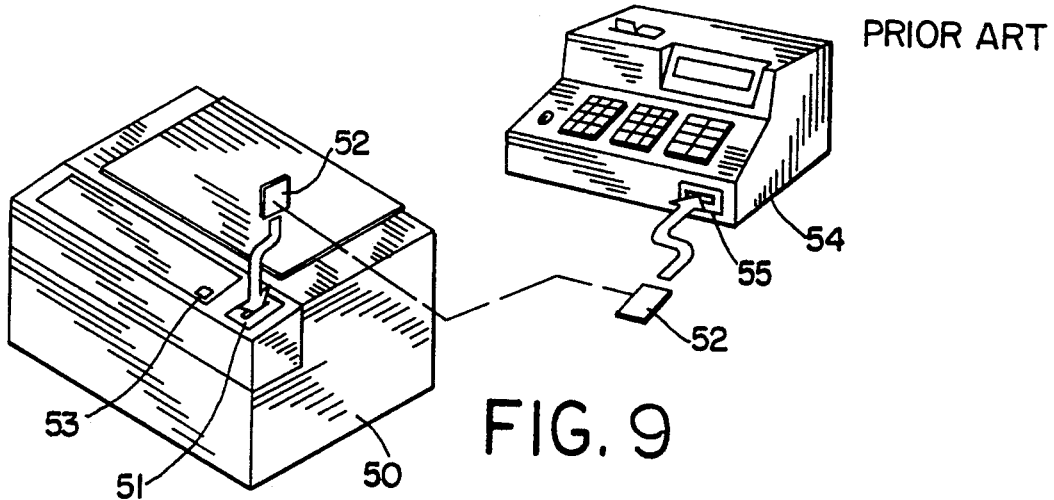
FIG. 9 is a perspective view of a conventional copy service device.

As shown in a flow chart of FIG. 8, a copy number is sent to the accounting device 30, counted up and stored (S1). When the completion switch SW2 is pushed after the end of the copying operation (S2), a charge is printed in bar code form on the card-like sheet 1 contained in the sheet container 34 (S3). Then the card-like sheet 1 is ejected from the sheet container 34 by the feed rollers 6 and 7 (S4). The copy number stored in the accounting device 30 is cleared at the same time as the ejection of the card-like sheet 1 (S5).

According to this example, the user need not receive the card-like sheet 1 from the store clerk before using the copying machine. The user has only to hand the card-like sheet 1 bearing the bar code to the cashier. Thus, the copy service becomes significantly simplified for both the user and the store clerk.

In the foregoing examples, a thermosensitive sheet is used as the card-like sheet. However, an ordinary sheet of paper may be used as the card-like sheet by using a thermal printer utilizing a thermal ribbon or other printing means which can provide a print clear enough for a bar code. Thus, ordinary paper can be used as a card-like sheet, resulting in a lower cost for expendables, the card-like sheets.

Moreover, a magnetic storage card may be used as the card-like sheet 1. By storing a code specific to a copying machine in a magnetic storage portion of the magnetic storage card, the magnetic storage card can be made to be used only in the corresponding copying machine. When the magnetic storage card is used as the card-like sheet, portions with reference numerals 5 and 8 in FIGS. 2 and 5 are a magnetic head and a roller, respectively.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A copy service accounting device for calculating a copy charge on the basis of data on a copy number output from a copying machine comprising:
   a printing means for printing the copy charge in bar code form on a card-like sheet;
   a slit through which the card-like sheet is inserted; and
   a copy enabling signal output means for outputting a copy enabling signal to the copying machine when insertion of the card-like sheet through the slit is detected, wherein the copy service accounting device is connected to the copying machine.

2. A copy service accounting device according to claim 1, wherein the card-like sheet is a thermosensitive sheet and the printing means is a thermal head printer.

3. A copy service accounting system comprising a copying machine and a copy service accounting device for calculating a copy charge based on data on a copy number output from the copying machine, wherein the copy service accounting device comprises:
   a printing means for printing the copy charge in bar code form on a card-like sheet;
   a slit through which the card-like sheet is inserted;
   a sheet detection means for outputting a sheet detection signal when the card-like sheet is inserted through the slit; and
   the copying machine comprises a first control means for starting the copying machine in response to a copy enabling signal from the copy service accounting device only when the sheet detection signal is input from the sheet detection means, wherein the copy device accounting device is connected to the copying machine.

4. A copy service accounting system according to claim 3, wherein the card-like sheet is a magnetic storage card and the copy service accounting device further comprises reading means for reading a code stored in the magnetic storage card, said code corresponding to the copying machine.

5. A copy service accounting system comprising a copying machine and a copy service accounting device for calculating a copy charge based on data on a copy number output from the copying machine, wherein the copy service accounting device comprises:
   a printing means for printing the copy charge in bar code form on a card-like sheet;
   a slit through which the card-like sheet is inserted;

a sheet detection means for outputting a sheet detection signal when the card-like sheet is inserted through the slit;

the copying machine comprising a first control means for starting the copying machine in response to a copy enabling signal from the copy service accounting device only when the sheet detection signal is input from the sheet detection means; and a punching means for punching the card-like sheet which has been once used.

6. A copy service accounting system comprising a copying machine and a copying service accounting device for calculating a copy charge based on data on a copy number output from the copying machine, wherein the copy service accounting device comprises:

a printing means for printing the copy charge in bar code form on a card-like sheet;

a slit through which the card-like sheet is inserted;

a sheet detection means for outputting a sheet detection signal when the card-like sheet is inserted through the slit;

the copying machine comprising a first control means for starting the copying machine in response to a copy enabling signal from the copy service accounting device only when the sheet detection signal is input from the sheet detection means;

a punching means for punching the card-like sheet which has been once used;

a detection means for detecting a hole on the card-like sheet punched by the punching means; and a second control means for starting the copying machine in response to an output from the detection means when no hole is detected.

* * * * *